(12) United States Patent
Yi et al.

(10) Patent No.: US 11,031,710 B2
(45) Date of Patent: Jun. 8, 2021

(54) ELECTRICAL CONNECTOR AND WIRE HARNESS ASSEMBLY WITH COMPRESSION CONTACTS

(71) Applicants: TE Connectivity Corporation, Berwyn, PA (US); Electrolux Home Products, Inc., Charlotte, NC (US)

(72) Inventors: Chong Hun Yi, Mechanicsburg, PA (US); Brian Keith Weaver, Harrisburg, PA (US); William James Moyer, II, Selinsgrove, PA (US); Ronald Skovira, Carlisle, PA (US); Gary Altemose, Harrisburg, PA (US); Richard Benjamin Emenheiser, Mount Joy, PA (US); William Thomas Anniss, III, Simpsonville, SC (US); Willard Grant, Williamstown, SC (US); Raony Barrios, Anderson, SC (US); William L. Small, Belton, SC (US); Marcello Correa Machado, Anderson, SC (US); Thomas W. McCollough, Anderson, SC (US); Christopher Stephan Rousey, Anderson, SC (US); Robert Astle, Middlefield, CT (US); George Nicholas Lauri, III, Windsor, CT (US); Ramesh Subramanian, Charlotte, NC (US)

(73) Assignees: TE CONNECTIVITY CORPORATION, Berwyn, PA (US); ELECTROLUX HOME PRODUCTS, INC., Charlotte, NC (US)

( * ) Notice: Subject to any disclaimer, the term of this patent is extended or adjusted under 35 U.S.C. 154(b) by 0 days.

(21) Appl. No.: 16/566,931

(22) Filed: Sep. 11, 2019

(65) Prior Publication Data
US 2020/0091638 A1 Mar. 19, 2020

Related U.S. Application Data

(60) Provisional application No. 62/730,787, filed on Sep. 13, 2018.

(51) Int. Cl.
*H01R 12/71* (2011.01)
*H01B 7/00* (2006.01)
(Continued)

(52) U.S. Cl.
CPC ......... *H01R 12/714* (2013.01); *H01B 7/0045* (2013.01); *H01R 4/2437* (2013.01);
(Continued)

(58) Field of Classification Search
CPC .. H01R 4/2429; H01R 4/2425; H01R 4/2462; H01R 4/2445; H01R 4/2437;
(Continued)

(56) References Cited

U.S. PATENT DOCUMENTS 4,315,663 A 2/1982 Olsson
5,306,177 A 4/1994 Burke et al.
(Continued)

FOREIGN PATENT DOCUMENTS

EP 0880986 A2 2/1998
EP 2180390 A2 4/2010
(Continued)

OTHER PUBLICATIONS

International Search Report, International Application No. PCT/US2019/050519, International Filing Date, Sep. 11, 2019.
(Continued)

*Primary Examiner* — Gary F Paumen

(57) ABSTRACT

A wire harness assembly including a first connector, a second connector, and conductors extending between the first connector and the second connector. Contacts are pro-
(Continued)

vided on the second connector. The contacts have termination sections which are mounted on the second connector, compliant sections which extend from the termination sections, and substrate engagement sections which extend from the compliant sections. The substrate engagement sections have curved contact sections which are configured to be positioned in mechanical and electrical engagement with circuit pads of a mating printed circuit board. Embossments are provided on the curved contact sections to provide additional strength and stability to the curved contact sections.

7 Claims, 4 Drawing Sheets

(51) Int. Cl.
*H01R 4/2437* (2018.01)
*H01R 13/24* (2006.01)
*H01R 13/50* (2006.01)
*H01R 31/06* (2006.01)

(52) U.S. Cl.
CPC ..... *H01R 13/2407* (2013.01); *H01R 13/2464* (2013.01); *H01R 13/50* (2013.01); *H01R 31/06* (2013.01)

(58) Field of Classification Search
CPC ............ H01R 13/2442; H01R 13/2407; H01R 13/2464; H01R 13/50; H01R 12/714; H01R 31/06; H01B 7/0045
USPC .......................................... 439/395, 398, 862
See application file for complete search history.

(56) References Cited

U.S. PATENT DOCUMENTS

| | | |
|---|---|---|
| 6,355,177 B2 | 3/2002 | Senner et al. |
| 6,533,926 B2 | 3/2003 | Hawkins et al. |
| 6,551,503 B2 | 4/2003 | Niers et al. |
| 6,758,680 B2 | 7/2004 | Duquerroy et al. |
| 7,836,708 B2 | 11/2010 | Krause et al. |
| 8,137,551 B1 | 3/2012 | Huda et al. |
| 8,354,024 B2 | 1/2013 | Ihle et al. |
| 8,366,930 B2 | 2/2013 | Huda et al. |
| 9,233,322 B1 | 1/2016 | Huda et al. |
| 9,901,852 B2 | 2/2018 | Huda et al. |
| 10,040,009 B1 | 8/2018 | Krause et al. |
| 10,040,703 B2 | 8/2018 | Huda et al. |
| 2005/0092665 A1 | 5/2005 | Kirchner |
| 2005/0173323 A1 | 8/2005 | Meuleners et al. |
| 2008/0280510 A1* | 11/2008 | Moll ...................... H01R 4/185 439/877 |
| 2016/0075566 A1 | 3/2016 | Froelicher et al. |
| 2016/0354715 A1 | 12/2016 | Bippus et al. |

FOREIGN PATENT DOCUMENTS

| | | |
|---|---|---|
| EP | 2312546 A2 | 4/2011 |
| JP | 2011 003355 A | 1/2011 |
| JP | 2011003355 A | 1/2011 |
| JP | 2013 247008 A | 12/2013 |
| JP | 2013247008 A | 12/2013 |
| WO | 03070351 A1 | 8/2003 |

OTHER PUBLICATIONS

International Search Report for PCT/US2019/051076 dated Feb. 26, 2020.
International Search Report for PCT/US2019/050519 dated Nov. 27, 2019.

* cited by examiner

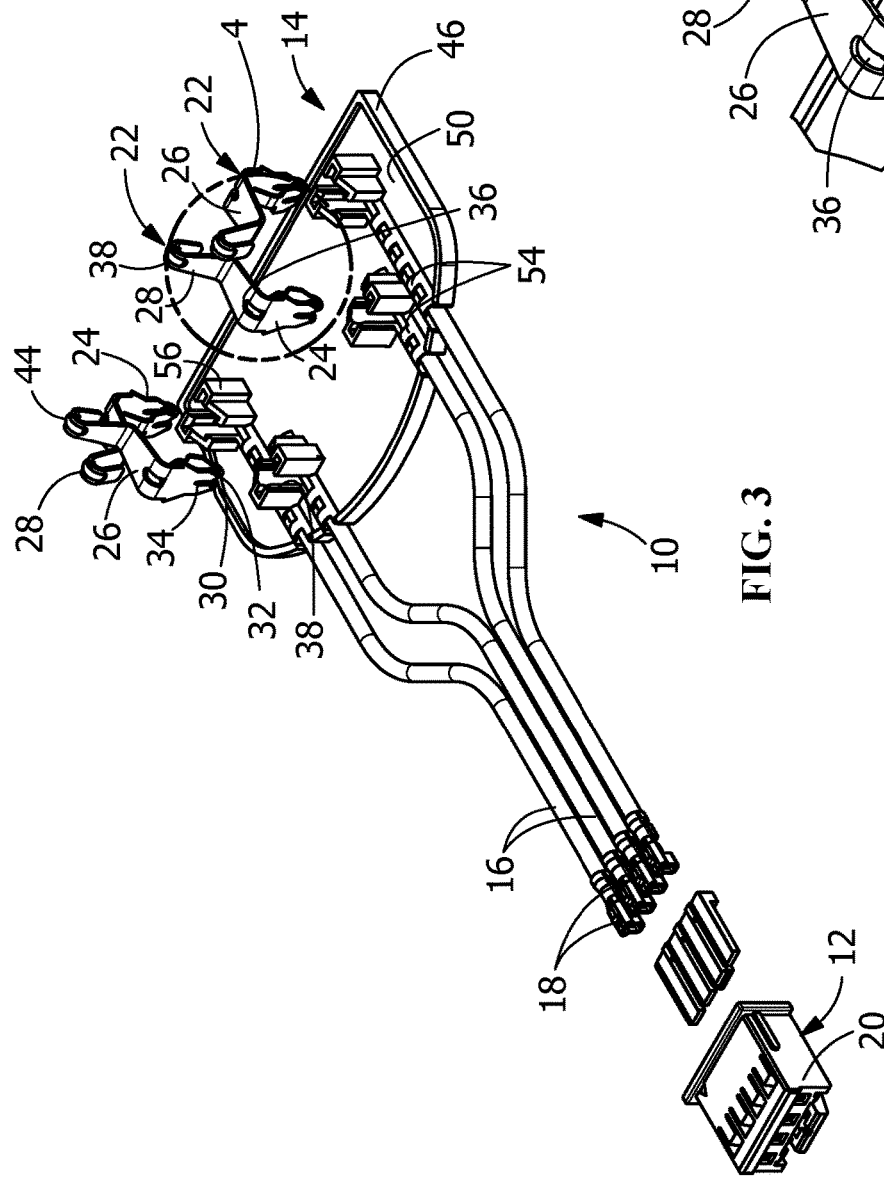
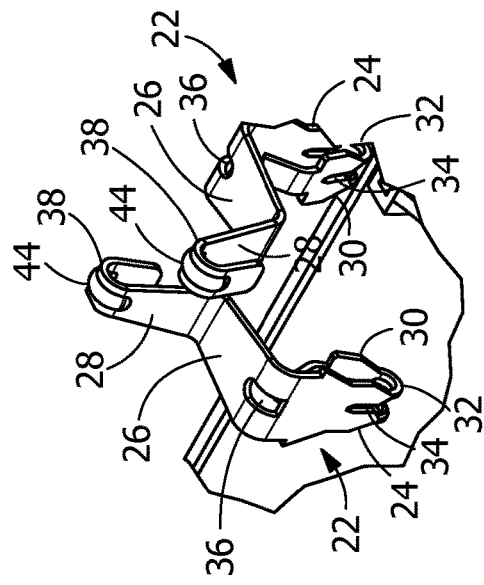
FIG. 3
FIG. 4

ELECTRICAL CONNECTOR AND WIRE HARNESS ASSEMBLY WITH COMPRESSION CONTACTS

CROSS REFERENCE TO RELATED APPLICATIONS

This non-provisional application claims the benefit under 35 U.S. Code § 119(e) of Provisional Application Ser. No. 62/730,787 filed Sep. 13, 2018 entitled ELECTRICAL CONNECTOR AND WIRE HARNESS ASSEMBLY WITH COMPRESSION CONTACTS and whose entire disclosure is incorporated by reference herein.

FIELD OF THE INVENTION

The present invention is directed an electrical connector and wire harness assembly for connecting to a substrate. In particular, the invention is directed to an electrical connector and wire harness assembly which has contacts which compress when mated to a substrate.

BACKGROUND OF THE INVENTION

In various applications, a movable component must make an electrical connection with a base component in order for the movable component to function properly when installed. Accordingly a need exists for an improved electrical connector.

SUMMARY OF THE INVENTION

An embodiment is directed to a wire harness assembly including a first connector, a second connector, and conductors extending between the first connector and the second connector. Contacts are provided on the second connector. The contacts have termination sections which are mounted on the second connector, compliant sections which extend from the termination sections, and substrate engagement sections which extend from the compliant sections. The substrate engagement sections have curved contact sections which are configured to be positioned in mechanical and electrical engagement with circuit pads of a mating printed circuit board. Embossments are provided on the curved contact sections.

An embodiment is directed to a wire harness assembly including a first connector, a second connector, and conductors extending between the first connector and the second connector. Contacts are provided on the second connector. The contacts have termination sections which are mounted on the second connector, compliant sections which extend from the termination sections, and substrate engagement sections which extend from the compliant sections. The termination sections have folded over areas provided proximate free ends. Insulation displacement slots are provided in the folded over areas and cooperate with the conductors. The second connector has a housing with an upper surface and an oppositely facing lower surface. Contact-receiving enclosures extend from the upper surface in a direction away from the lower surface, the contact-receiving enclosures are dimensioned to receive the free ends of the termination sections of the contacts and a portion of the folded over areas therein. Conductor-receiving conduits are provided between the upper surface and the lower surface, the conductor-receiving conduits are dimensioned to receive a portion of the conductors therein. The conductors positioned in the conductor-receiving conduits extend through the contact-receiving enclosures.

An embodiment is directed to an electrical connector for use with a wire harness assembly. Contacts provided on the electrical connector. The contacts have termination sections which are mounted on the electrical connector, compliant sections which extend from the termination sections, and substrate engagement sections which extend from the compliant sections. The termination sections have folded over areas provided proximate free ends. Insulation displacement slots are provided in the folded over areas and cooperate with the conductors. The electrical connector includes a housing with an upper surface and an oppositely facing lower surface. Contact-receiving enclosures extend from the upper surface in a direction away from the lower surface. The contact-receiving enclosures are dimensioned to receive portions of the termination sections of the contacts. Conductor-receiving conduits are provided between the upper surface and the lower surface. The conductor-receiving conduits are dimensioned to receive a portion of the conductors therein. The conductors positioned in the conductor-receiving conduits extend through the contact-receiving enclosures.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is an exploded perspective view of the electrical connector and wire harness of FIG. 1.

FIG. 4 is an enlarged view of several contacts of the electrical connector of FIG. 3.

DETAILED DESCRIPTION OF THE INVENTION

Figure 1:
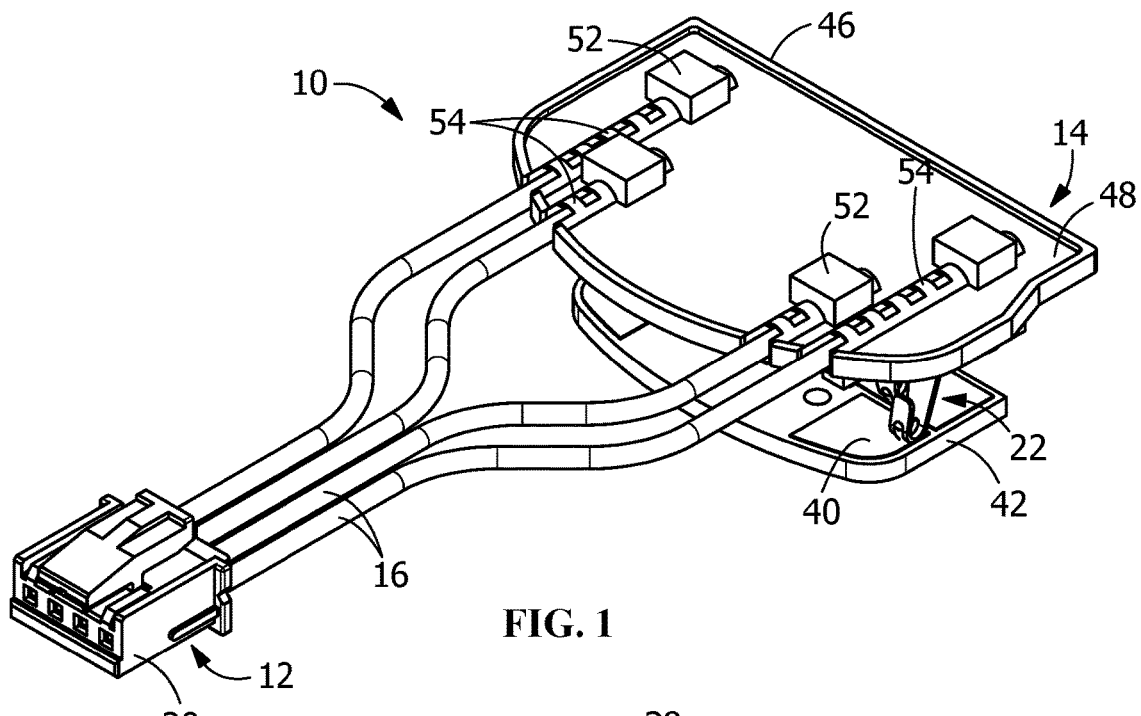
FIG. 1 is a top perspective view of an illustrative embodiment of an electrical connector and wire harness according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

It may be desirable for a movable component to make an electrical connection with a base component. For example, it may be desirable to position a removable water filter in electrical connection with the circuitry of a refrigerator (e.g., in order for the refrigerator to allow water to flow to through the removable filter to properly filter the water). An electrical connector which interfaces with the movable component (e.g., water filter) may be used to make an electrical connection with the electrical component of the movable component as the contacts of the electrical connector are compressed. Such connection may be achieved through the use of printed circuit boards and expensive contacts of the electrical connector. However, it would be beneficial to provide an electrical connector with movable components which does not require a printed circuit board and which does not require expensive contacts, while providing a reliable electrical connection.

Figure 2:
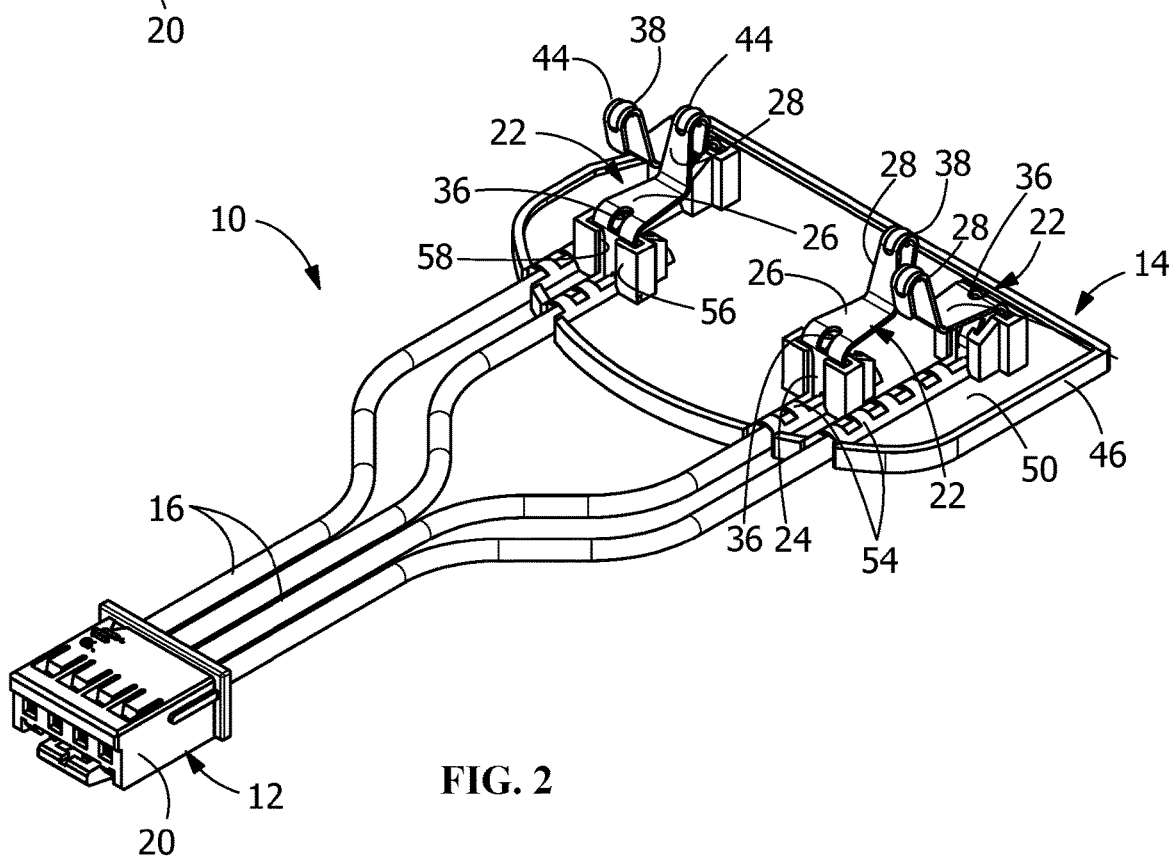
FIG. 2 is a bottom perspective view of the electrical connector and wire harness of FIG. 1.

Referring to FIGS. 1 and 2, an illustrative wire harness 10 includes a first connector 12, a second connector 14 and wires or conductors 16 extending therebetween. In the embodiment shown, four conductors 16 are provided, but other number of conductors 16 can be provided to accommodate the electrical requirements without departing from the scope of the invention.

Contacts 18 are provided at one end of the conductors 16. The contacts 18 are configured to be inserted into the housing 20 of the first connector 12. While crimped contacts 18 are shown, the contacts 18 are not so limited. In addition, the first connector 12 is not limited to the type of plug connector shown. In some embodiments, the first connector 12 is connected to the circuitry of an appliance, such as a refrigerator.

As best shown in FIGS. 2 through 4, the second connector 14 has contacts 22 provided therein. In the embodiment shown, four contacts 22 are provided so that each of the conductors 16 may be terminated. However, other numbers of contacts 22 may be provided based on the number of conductors 16. The contacts 22 are stamped and formed from material having the appropriate electrical and mechanical characteristics.

The contacts 22 have wire termination sections 24, transition or compliant sections 26 and substrate engagement sections 28. The wire termination sections 24 have folded over areas 30 provided proximate the free ends 32. Slots 34 are provided in the folded over areas 30 to form insulation displacement slots which cooperate with the conductors 16 to place the contacts 22 in electrical engagement with the conductors 16.

The transition or compliant sections 26 extend from the wire termination sections 24. In the illustrative embodiment shown, the transition or compliant sections 26 extend at essentially right angles from the wire termination sections 24, although other angles may be used. Embossments 36 extend from the wire termination sections 24 to the transition or compliant sections 26 to provide additional strength and stability between the wire termination sections 24 and the transition or compliant sections 26. The shape, size and positioning of the embossments 36 may be varied depending upon the amount of stiffness or resiliency of the contacts that is desired.

The substrate engagement sections 28 extend from the transition or compliant sections 26. In the illustrative embodiment shown, the substrate engagement sections 28 extend at essentially right angles from the transition or compliant sections 26, although other angles may be used. The substrate engagement sections 28 have curved contact sections 38 which are configured to be positioned in mechanical and electrical engagement with circuit pads 40 (e.g., of a mating printed circuit board 42). In some embodiments, the printed circuit board is part of a waterfilter. In a particular embodiment, the wire harness 10 is positioned within a refrigerator manifold that is configured to receive a water filter. In such embodiment, the wire harness 10 may be employed to establish an electrical connection between the circuitry of the refrigerator and the printed circuit board of the water filter. Embossments 44 are provided on the curved contact sections 38 to provide additional strength and stability to the curved contact sections 38. The shape, size and positioning of the embossments 44 may be varied depending upon the amount of stiffness or resiliency of the contacts that is desired.

The housing 46 of the second connector 14 has an upper surface 48 and an oppositely facing lower surface 50. Contact-receiving enclosures 52 extend from the upper surface 48 in a direction away from the lower surface 50. In the embodiment shown, four contact-receiving enclosures 52 are provided so that each of the contacts 22 may be positioned in a contact-receiving enclosure 52. However, other numbers of contact-receiving enclosures 52 may be provided based on the number of contacts 22 and conductors 16. The contact-receiving enclosures 52 are dimensioned to receive the free ends 32 of the contacts 22 and a portion of the folded over areas 30 of the wire termination sections 24 therein.

Conductor-receiving conduits 54 are provided between the upper surface 48 and the lower surface 50. The conductor-receiving conduits 54 are dimensioned to receive a portion of the conductors 16 therein. The conductor-receiving conduits 54 are provided in-line with the contact-receiving enclosures 52 such that the conductors 16 positioned in the conductor-receiving conduits 54 extend through the contact-receiving enclosures 52.

Contact-receiving projections 56 extend from the lower surface 50 in a direction away from the upper surface 48. In the embodiment shown, four contact-receiving projections 56 are provided so that each of the contacts 22 may be positioned in a contact-receiving projection 56. However, other numbers of contact-receiving projections 56 may be provided based on the number of contacts 22 and conductors 16. Slots 58 are provided in the contact-receiving projections 56. The slots 58 are dimensioned to receive and retain a portion of the folded over areas 30 of the wire termination sections 24 therein.

During assembly of the second electrical connector 14 and the wire harness 10, the conductors 16 are inserted in the conductor-receiving conduits 54, such that ends of the conductors 16 extend in the conductor-receiving conduits 54 past the contact-receiving enclosures 52.

With the conductors 16 fully inserted, the contacts 22 are inserted into the housing 46 from the bottom surface 50. The folded over areas 30 of the wire termination sections 24 are inserted into the slots 58 of the contact-receiving projections 56. As the insertion of the contacts 22 continues, the slots 34 of the folded over areas 30 of the wire termination sections 24 engage the conductors 16 positioned in the conductor-receiving conduits 54, causing the insulation of the conductors 16 to be displaced, as is known for insulation displacement type contacts, and providing a mechanical and electrical connection between the contacts 22 and the conductors 16.

With the wire termination sections 24 properly positioned in the slots 58 of the contact-receiving projections 56, the wire termination sections 24 are maintained in position by barbs, interference fit, or other know means.

With the contacts 22 properly secured to the conductors 16 and the housing 46 of the electrical connector 14, the printed circuit board 42 is moved into engagement with the curved sections 38 of the substrate engagement sections 28 of the contacts 22. As this occurs, the contacts 22 are resilient compresses or deformed, such that the curved sections 38 of the substrate engagement sections 28 of the contacts 22 exert a force on the circuit pads 40 of the printed circuit board 42 to retain the contacts 22 in mechanical and electrical engagement with the circuit pads 40.

When mating between the printed circuit board 42 and the contacts 22 occurs, the movement of the printed circuit board 42 toward the electrical connector 14 causes the contacts 22 to resilient deform or deflect by 4 mm or more to provide a sufficient mating force between the contacts 22 and the circuit pads 40. As the resilient deflection of the contacts 22 occur, the wire termination sections 24 remains in a fixed position in the slots 58 of the contact-receiving projections 56. The substrate engagement sections 28 are moved in a direction which is essentially parallel to the longitudinal axis of the contacts 22, causing the transition or compliant sections 26 to pivot about the points where the transition or compliant sections 26 engage the wire termination sections 24. The rigidity of the points where the transition or compliant sections 26 engage the wire termination sections 24 and the rigidity of the embossments 36 determine the mating force applied by the contacts 22 to the circuit pads 40.

After mating of the circuit pads 40 to the contacts 22 occurs, the electrical connector 14 and the circuit board 42 are maintained in position by latches or other means to prevent the unwanted withdraw of the circuit pads 40 from the contacts 22.

Figure 5:
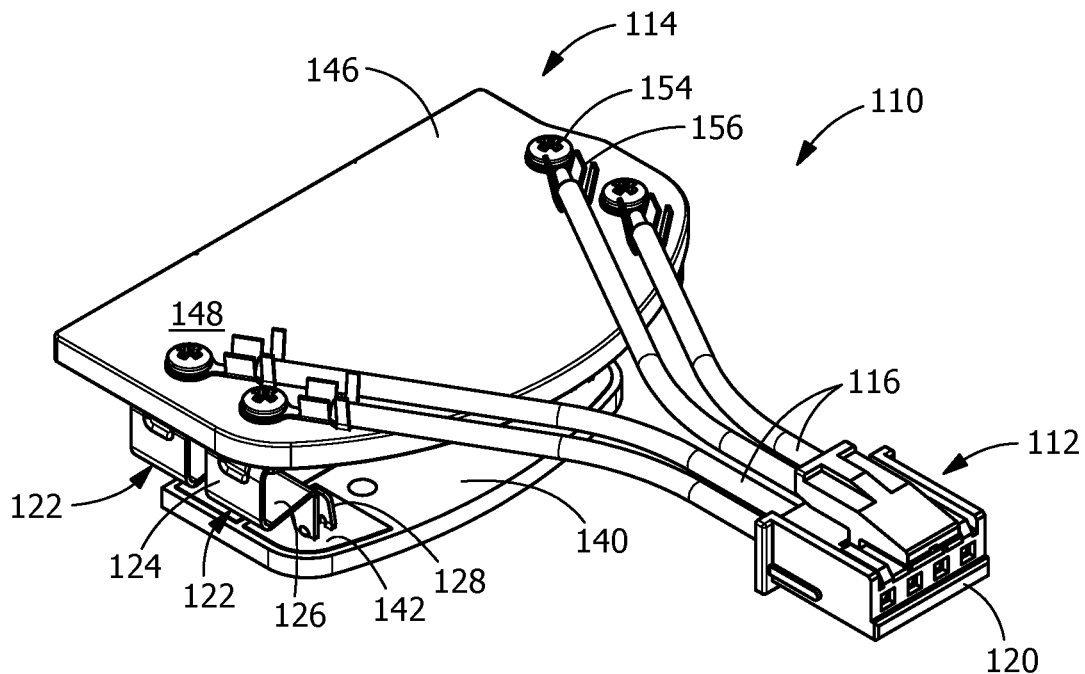
FIG. 5 is a top perspective view of a second illustrative embodiment of an electrical connector and wire harness according to the present invention.
Figure 6:
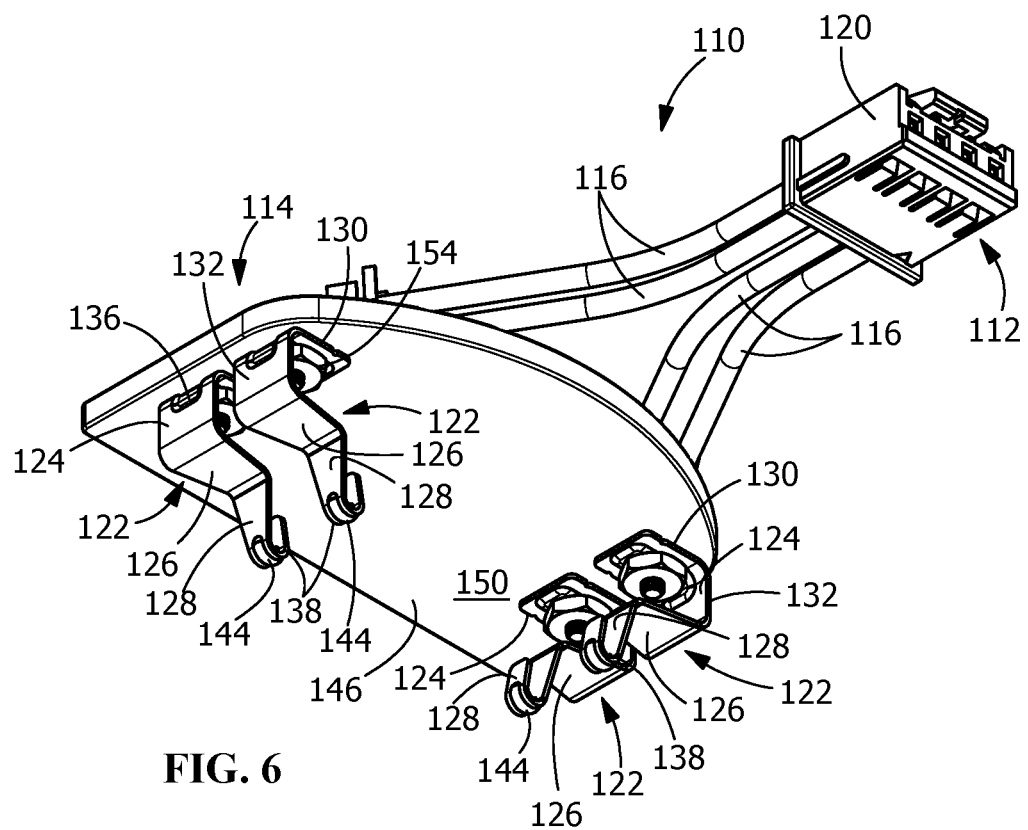
FIG. 6 is a bottom perspective view of the electrical connector and wire harness of FIG. 5.
Figure 7:
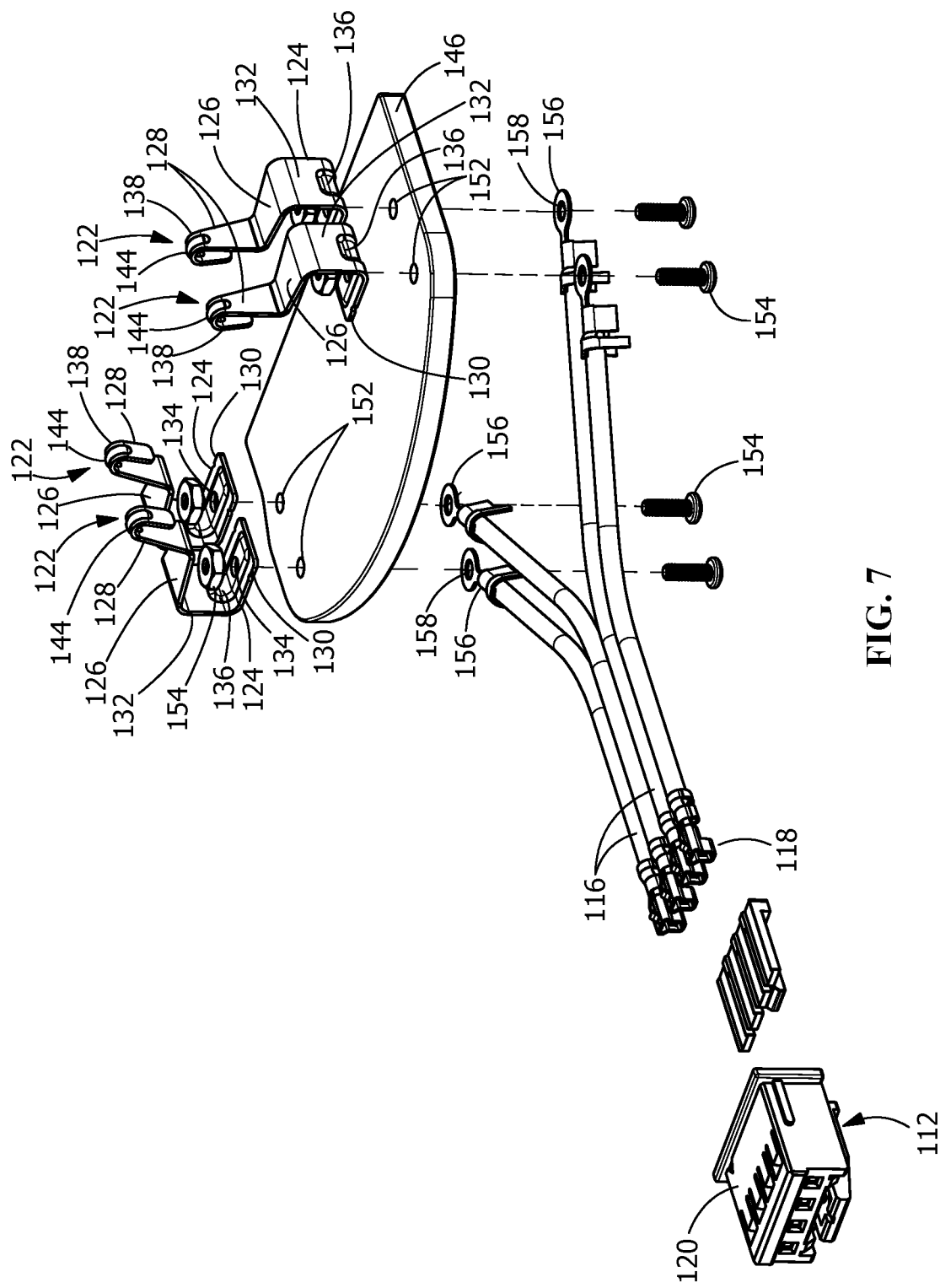
FIG. 7 is an exploded perspective view of the electrical connector and wire harness of FIG. 5.

Referring to FIGS. 5 through 7, a second illustrative wire harness 110 includes a first connector 112, a second connector 114 and wires or conductors 116 extending therebetween. In the embodiment shown, four conductors 116 are provided, but other number of conductors 116 can be provided to accommodate the electrical requirements without departing from the scope of the invention.

Contacts 118 are provided at one end of the conductors 116. The contacts 118 are configured to be inserted into the housing 120 of the first connector 112. While crimped contacts 118 are shown, the contacts 118 are not so limited. In addition, the first connector 112 is not limited to the type of plug connector shown. In some embodiments, the first connector 112 is connected to the circuitry of an appliance (e.g., a refrigerator).

As best shown in FIGS. 6 and 7, the second connector 114 has contacts 122 provided therein. In the embodiment shown, four contacts 122 are provided so that each of the conductors 116 may be terminated. However, other numbers of contacts 122 may be provided based on the number of conductors 116. The contacts 122 are stamped and formed from material having the appropriate electrical and mechanical characteristics.

The contacts 122 have housing termination sections 124, transition or compliant sections 126 and substrate engagement sections 128. The housing termination sections 124 have housing engagement members 130 which extend from vertical members 132. Mounting openings 134 (FIG. 7) are provided in the housing engagement members 130. In the illustrative embodiment shown, the housing engagement members 130 extend at essentially right angles from the vertical members 132, although other angles may be used. Embossments 136 extend from the housing engagement members 130 to the vertical members 132 to provide additional strength and stability. The shape, size and positioning of the embossments 136 may be varied depending upon the amount of stiffness or resiliency of the contacts that is desired.

The transition or compliant sections 126 extend from the housing termination sections 124. In the illustrative embodiment shown, the transition or compliant sections 126 extend at essentially right angles from the housing termination sections 124, although other angles may be used.

The substrate engagement sections 128 extend from the transition or compliant sections 126. In the illustrative embodiment shown, the substrate engagement sections 128 extend at essentially right angles from the transition or compliant sections 126, although other angles may be used. The substrate engagement sections 128 have curved contact sections 138 which are configured to be positioned in mechanical and electrical engagement with circuit pads 142 of a mating printed circuit board 140 (FIG. 5). Embossments 144 are provided on the curved contact sections 138 to provide additional strength and stability between the curved contact sections 138. The shape, size and positioning of the embossments 144 may be varied depending upon the amount of stiffness or resiliency of the contacts that is desired.

The housing 146 of the second connector 114 has an upper surface 148 and an oppositely facing lower surface 150. As best shown in FIG. 7, openings 152 extend from the upper surface 148 to the lower surface 150. In the embodiment shown, four openings 152 are provided, however other numbers of openings 152 may be provided based on the number of contacts 122 and conductors 116. The openings 152 are dimensioned to receive the mounting hardware 154 therein.

Ring contacts 156 are provided at the ends of the conductors 116. The ring contacts 156 are provided in-line with the openings 152. The ring contacts 156 have openings 158 to receive the mounting hardware 154 therein.

During assembly of the second electrical connector 114 and the wire harness 110, the openings 158 of the ring contacts 156 of the conductors 116 are positioned in line with the openings 152. The mounting openings 134 of the contacts 122 are also positioned in line with the openings 152. The mounting hardware 154 is inserted through the openings 158, the openings 152 and the openings 134 to secure the conductors 116 and the contacts 122 to the housing 146. The mounting hardware 146 also provides the electrical connection between the ring contacts 156 of the conductors 116 and the contacts 122.

With the contacts 122 properly secured to the housing 146 of the electrical connector 114, the printed circuit board 140 is moved into engagement with the curved sections 138 of the substrate engagement sections 128 of the contacts 122. As this occurs, the contacts 122 are resilient compresses or deformed, such that the curved sections 138 of the substrate engagement sections 128 of the contacts 122 exert a force on the circuit pads 142 of the printed circuit board 140 to retain the contacts 122 in mechanical and electrical engagement with the circuit pads 142.

When mating between the printed circuit board 140 and the contacts 122 occurs, the movement of the printed circuit board 140 toward the electrical connector 114 causes the contacts 122 to resilient deform or deflect by 4 mm or more to provide a sufficient mating force between the contacts 122 and the circuit pads 142. As the resilient deflection of the contacts 122 occur, the housing engagement members 130 and the vertical members 132 of the housing termination sections 124 remains in a fixed position. The substrate engagement sections 128 are moved in a direction which is essentially parallel to the longitudinal axis of the contacts 122, causing the transition or compliant sections 126 to pivot about the points where the transition or compliant sections 126 engage the vertical members 132. The rigidity of the points where the transition or compliant sections 26 engage the vertical members 132 determine the mating force applied by the contacts 122 to the circuit pads 142.

After mating of the circuit pads 142 to the contacts 122 occurs, the electrical connector 114 and the circuit board 140 are maintained in position by latches or other means to prevent the unwanted withdraw of the circuit pads 142 from the contacts 122.

In a particular embodiment, a refrigerator may include the wire harness 110, and the wire harness 110 may be connected to the circuitry of the refrigerator. The wire harness 110 may part of a refrigerator manifold that is configured to receive a water filter. In this regard, the printed circuit board 140 may be located on the exterior of the water filter and connected to the circuitry of the water filter. When the water filter is inserted into the manifold, the wire harness 110 engages the printed circuit board 140 in order to establish an electrical connection between the circuitry of the refrigerator and the circuitry of the water filter.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A wire harness assembly comprising:
a first connector;
a second connector;
conductors extending between the first connector and the second connector;
contacts provided on the second connector, the contacts have termination sections which are mounted on the second connector, compliant sections which extend from the termination sections, and substrate engagement sections which extend from the compliant sections, the termination sections having folded over areas provided proximate free ends, insulation displacement slots provided in the folded over areas cooperate with the conductors;
the second connector having a housing with an upper surface and an oppositely facing lower surface, contact-receiving enclosures extend from the upper surface in a direction away from the lower surface, the contact-receiving enclosures are dimensioned to receive the free ends of the termination sections of the contacts and a portion of the folded over areas therein, contact-receiving projections extend from the lower surface in a direction away from the upper surface, slots provided in the contact-receiving projections, the slots are dimensioned to receive and retain a portion of the folded over areas of the termination sections therein;
conductor-receiving conduits provided between the upper surface and the lower surface, the conductor-receiving conduits are dimensioned to receive a portion of the conductors therein, wherein the conductors positioned in the conductor-receiving conduits extend through the contact-receiving enclosures.

2. The wire harness assembly as recited in claim 1, wherein the compliant sections extend at right angles from the termination sections.

3. The wire harness assembly as recited in claim 2, wherein embossments extend from the termination sections to the compliant sections to provide additional strength and stability between the termination sections and the compliant sections.

4. The wire harness assembly as recited in claim 3, wherein the substrate engagement sections extend at right angles from the compliant sections.

5. The wire harness assembly as recited in claim 4, wherein the substrate engagement sections have curved contact sections which are configured to be positioned in mechanical and electrical engagement with circuit pads of a mating printed circuit board.

6. The wire harness assembly as recited in claim 5, wherein embossments are provided on the curved contact sections to provide additional strength and stability to the curved contact sections.

7. An electrical connector for use with a wire harness assembly, the electrical connector comprising:
contacts provided on the electrical connector, the contacts have termination sections which are mounted on the electrical connector, compliant sections which extend from the termination sections, and substrate engagement sections which extend from the compliant sections, the termination sections having folded over areas provided proximate free ends, insulation displacement slots provided in the folded over areas cooperate with conductors of the wire harness assembly, the substrate engagement sections having curved contact sections which are configured to be positioned in mechanical and electrical engagement with circuit pads of a mating printed circuit board, first embossments extend from the termination sections to the compliant sections, second embossments provided on the curved contact sections;
a housing with an upper surface and an oppositely facing lower surface, contact-receiving enclosures extend from the upper surface in a direction away from the lower surface, the contact-receiving enclosures dimensioned to receive portions of the termination sections of the contacts, contact-receiving projections extend from the lower surface in a direction away from the upper surface, slots provided in the contact-receiving projections, the slots are dimensioned to receive and retain a portion of the folded over areas of the termination sections therein;

conductor-receiving conduits provided between the upper surface and the lower surface, the conductor-receiving conduits dimensioned to receive a portion of the conductors therein, wherein the conductors positioned in the conductor-receiving conduits extend through the contact-receiving enclosures.

* * * * *